US011917682B2

(12) United States Patent
Kawamura et al.

(10) Patent No.: US 11,917,682 B2
(45) Date of Patent: Feb. 27, 2024

(54) WIRELESS LAN SYSTEM AND INTERFERENCE CONTROL METHOD

(71) Applicant: NIPPON TELEGRAPH AND TELEPHONE CORPORATION, Tokyo (JP)

(72) Inventors: Kenichi Kawamura, Musashino (JP); Yasushi Takatori, Musashino (JP); Tomoyuki Yamada, Musashino (JP); Hiroshi Nakamoto, Musashino (JP); Keisuke Wakao, Musashino (JP); Shota Nakayama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 470 days.

(21) Appl. No.: 17/292,703

(22) PCT Filed: Nov. 8, 2019

(86) PCT No.: PCT/JP2019/043849
§ 371 (c)(1),
(2) Date: May 10, 2021

(87) PCT Pub. No.: WO2020/100735
PCT Pub. Date: May 22, 2020

(65) Prior Publication Data
US 2022/0007419 A1 Jan. 6, 2022

(30) Foreign Application Priority Data
Nov. 13, 2018 (JP) .................... 2018-213122

(51) Int. Cl.
*H04W 4/00* (2018.01)
*H04L 1/1867* (2023.01)
*H04W 84/12* (2009.01)

(52) U.S. Cl.
CPC ....... *H04W 74/0816* (2013.01); *H04L 1/1896* (2013.01); *H04W 84/12* (2013.01)

(58) Field of Classification Search
CPC . H04W 72/12; H04W 72/50; H04W 74/0816; H04W 84/12
See application file for complete search history.

(56) References Cited

U.S. PATENT DOCUMENTS 10,681,734 B2 * 6/2020 Oteri ................. H04W 72/27
2019/0373301 A1 * 12/2019 Gunasekara ....... H04N 21/6405
2020/0404509 A1 * 12/2020 Gundu Rao .......... H04W 72/23

OTHER PUBLICATIONS

IEEE, Part 11: Wireless LAN Medium Access Control (MAC) and Physical Layer (PHY) Specifications, literature, Aug. 2016.

* cited by examiner

*Primary Examiner* — Shantell L Heiber
(74) *Attorney, Agent, or Firm* — Harness, Dickey & Pierce, P.L.C.

(57) ABSTRACT

Provided is a wireless LAN system in which an interference control signal transmitter that is provided in the surroundings of the wireless LAN base station and the wireless LAN terminal, and is configured to collect wireless environment information regarding the interfering AP/STA, and transmit, to the interfering AP/STA, an interference control signal that is to be used to set a transmission waiting period; and an interference control signal management device configured to collect the wireless environment information from the interference control signal transmitter, determine the interference control signal transmitter whose communication area includes the interfering AP/STA based on the wireless environment information, and control the determined interference control signal transmitter to transmit the interference control signal to be used to set the transmission waiting period that corresponds to a length of time of the communication between the wireless LAN base station and the (Continued)

wireless LAN terminal, wherein while the interfering AP/STA that has received the interference control signal sets the transmission waiting period, the wireless LAN base station and the wireless LAN terminal preferentially perform communication.

7 Claims, 7 Drawing Sheets

WIRELESS LAN SYSTEM AND INTERFERENCE CONTROL METHOD

CROSS-REFERENCE TO RELATED APPLICATIONS

This application is a 371 U.S. National Phase of International Application No. PCT/JP2019/043849 filed on Nov. 8, 2019, which claims priority to Japanese Application No. 2018-213122 filed on Nov. 13, 2018. The entire disclosures of the above applications are incorporated herein by reference.

TECHNICAL FIELD

The present invention relates to a wireless LAN system and an interference control method that ensure low delay and low jitter of a wireless LAN terminal despite co-channel interference.

BACKGROUND ART wireless LANs have become widespread as a wireless access means, due to their broadband and convenience of easy installation for anyone. Representative frequencies used by wireless LANs are 2.4 GHz and 5 GHz bands. These frequency bands are unlicensed frequency bands, and thus are available for anyone that installs a wireless device without applying for a license.

The specification of wireless LANs is defined by the IEEE (NPL 1), and the wireless LANs use CSMA/CA (Carrier Sense Multiple Access with Collision Avoidance) as a wireless access method. In the CSMA/CA, each wireless LAN terminal performs carrier sensing before transmission, and then starts transmission if it is confirmed that a channel is idle for a certain period of time. If a channel is used, the wireless LAN terminal waits until the use of the channel ends, and further waits a predetermined period of time as well as the randomly selected number of slots before performing transmission, and if the channel is not used during this period of time, the wireless LAN terminal then transmits a wireless frame.

By autonomously avoiding a collision between a plurality of wireless LAN terminals in this manner, wireless communication is performed. However, in the CSMA/CA, there is the hidden terminal problem that a collision occurs between signals sent from terminals that cannot sense each other even through carrier sensing, and a reception error occurs. In order to solve the hidden terminal problem, an RTS/CTS protocol is implemented as a standard technology. This is a protocol in which before transmission, a signal called RTS is sent, and a receiver transmits a CTS upon receiving the RTS. After having confirmed that this exchange is complete, a transmitter transmits an actual data frame. In the RTS and CTS frames, a period of time required for transmission of the data frame to be transmitted is described in the duration field, and the wireless LAN terminals that have received the broadcasted RTS and CTS wait to perform transmission for the period of time described in the duration field. In wireless LANs, the "waiting to perform transmission" is a mechanism called a NAV (Network Allocation Vector), and is to virtually set a medium as being busy, through carrier sensing. As a result of the RTS/CTS protocol being performed prior to transmission of a data frame, transmission from the surroundings is suppressed and interference is reduced.

One example of usage of a CTS signal is so-called CTS-to-self. This is not the above-described RTS/CTS protocol but a protocol in which a CTS alone is transmitted, and is to solve the problem that a data frame that uses a new physical transmission method cannot be sensed by a wireless LAN terminal that has a past standard, due to backward compatibility with a new wireless standard. Specifically, the CTS-to-self is used when a terminal sends a CTS to itself using an old transmission method before performing transmission so that other terminals wait to perform communication, and sends a data frame using a new transmission method. This prevents a collision of packets that may be caused when a terminal that is not compatible with a new transmission method cannot be sensed.

CITATION LIST

Non Patent Literature

[NPL 1] P802.11-REVmc/D8.0, August 2016—IEEE Approved Draft Standard for Information technology—Telecommunications and information exchange between systems—Local and metropolitan area networks—Specific requirements Part 11: Wireless LAN Medium Access Control (MAC) and Physical Layer (PHY) Specifications

SUMMARY OF THE INVENTION

Technical Problem

If the aforementioned basic communication method of wireless LAN systems is used, stable quality can be ensured in such circumstances where there are a small number of terminals, and little interference from the surroundings occurs. However, if the number of terminals increases and interference from the surroundings become larger, communication quality will deteriorate due to a collision between wireless frames and frequent issuance of wait before-transmit. In particular, in a case of an application that requires real-time characteristics, such as a VoIP (Voice over IP) and a streaming video, communication quality is problematic due to delay or jitter of a wireless LAN.

To address the issue, the basic wireless LAN standards (NPL 1) also employs QoS (Quality of Service) technology, and quality improvement technology is standardized that uses admission control of setting a different waiting time period for every priority in carrier sensing, or uses polling type centralized control. Part of these technologies is actually widely used. However, in a case where equipment in a factory or the like is controlled via a network, or a case of a VR (Virtual Reality) application or the like, communication with lower delay and lower jitter may be required, and in order to accommodate them, a wireless LAN needs to ensure higher quality than that required in the conventional technology. Particularly, since wireless LANs use unlicensed frequencies and anyone can install a wireless device without applying for a license, it is necessary to suppress interference from the surroundings, in order to realize stable communication.

An object of the present invention is to provide a wireless LAN system and an interference control method that suppress interference from a surrounding co-channel wireless LAN device, and are also applicable to an application that has requirements of low delay and low jitter.

Means for Solving the Problem

A first invention relates to a wireless LAN system in which, in the surroundings of a wireless LAN base station and a wireless LAN terminal that perform communication with each other, there is an interfering AP/STA that is to transmit an interference signal, including: an interference control signal transmitter that is provided in the surroundings of the wireless LAN base station and the wireless LAN terminal, and is configured to collect wireless environment information regarding the interfering AP/STA, and transmit, to the interfering AP/STA, an interference control signal that is to be used to set a transmission waiting period; and an interference control signal management device configured to collect the wireless environment information from the interference control signal transmitter, determine the interference control signal transmitter whose communication area includes the interfering AP/STA based on the wireless environment information, and control the determined interference control signal transmitter to transmit the interference control signal to be used to set the transmission waiting period that corresponds to a length of time of the communication between the wireless LAN base station and the wireless LAN terminal, wherein while the interfering AP/STA that has received the interference control signal sets the transmission waiting period, the wireless LAN base station and the wireless LAN terminal preferentially perform communication.

In the wireless LAN system according to the first invention, if there are a plurality of the interference control signal transmitters, the interference control signal management device is configured to perform control such that the transmission waiting periods to be set using the interference control signals transmitted from the interference control signal transmitters are equal to each other, and the interference control signal transmitters transmit the interference control signals in synchronization with each other.

In the wireless LAN system according to the first invention, if there are a plurality of the interference control signal transmitters, the interference control signal management device is configured to perform control such that the interference control signal transmitters transmit the interference control signals in a predetermined order, and the transmission waiting periods to be set using the interference control signals end at the same time.

In the wireless LAN system according to the first invention, the interference control signal is a CTS signal that is used to set the transmission waiting period when a wireless LAN device that is not the destination of the CTS signal receives the CTS signal, and the interference control signal management device is configured to perform control such that the destination of the CTS signal is set to the wireless LAN base station when the wireless LAN base station transmits downlink data, and the destination of the CTS signal is set to the wireless LAN terminal when the wireless LAN terminal transmits uplink data.

In the wireless LAN system according to the first invention, the wireless LAN base station includes a distributed antenna that is arranged in the surroundings of the wireless LAN base station and the wireless LAN terminal, and the wireless LAN base station has functions of the interference control signal transmitter of collecting wireless environment information regarding the interfering AP/STA via the distributed antenna, and transmitting, to the interfering AP/STA, an interference control signal that is to be used to set a transmission waiting period, and has functions of the interference control signal management device of determining the distributed antenna whose communication area includes the interfering AP/STA based on the wireless environment information, and performing control such that the interference control signal is transmitted from the determined distributed antenna, the interference control signal being used to set the transmission waiting period that corresponds to a length of time of the communication between the wireless LAN base station and the wireless LAN terminal.

A second invention relates to an interference control method of a wireless LAN system in which, in the surroundings of a wireless LAN base station and a wireless LAN terminal that perform communication with each other, there is an interfering AP/STA that is to transmit an interference signal, the method including the steps of: an interference control signal transmitter provided in the surroundings of the wireless LAN base station and the wireless LAN terminal collecting wireless environment information regarding the interfering AP/STA, and transmitting, to the interfering AP/STA, an interference control signal that is to be used to set a transmission waiting period; and an interference control signal management device configured to collect the wireless environment information from the interference control signal transmitter determining the interference control signal transmitter whose communication area includes the interfering AP/STA based on the wireless environment information, and controlling the determined interference control signal transmitter to transmit the interference control signal to be used to set the transmission waiting period that corresponds to a length of time of the communication between the wireless LAN base station and the wireless LAN terminal, wherein while the interfering AP/STA that has received the interference control signal sets the transmission waiting period, the wireless LAN base station and the wireless LAN terminal preferentially perform communication.

In the interference control method of the wireless LAN system according to the second invention, the wireless LAN base station includes a distributed antenna that is arranged in the surroundings of the wireless LAN base station and the wireless LAN terminal, and the wireless LAN base station executes functions of the interference control signal transmitter of collecting wireless environment information regarding the interfering AP/STA via the distributed antenna, and transmitting, to the interfering AP/STA, an interference control signal that is to be used to set a transmission waiting period, and executes functions of the interference control signal management device of determining the distributed antenna whose communication area includes the interfering AP/STA based on the wireless environment information, and performing control such that the interference control signal is transmitted from the determined distributed antenna, the interference control signal being used to set the transmission waiting period that corresponds to a length of time of the communication between the wireless LAN base station and the wireless LAN terminal.

Effects of the Invention

According to the present invention, it is possible to suppress interference from a surrounding interfering AP/STA, protect communication between a wireless LAN device and a wireless LAN terminal in a specific region, and improve the communication quality (delay, jitter, and packet loss) in a wireless LAN.

DESCRIPTION OF EMBODIMENTS

Figure 1:
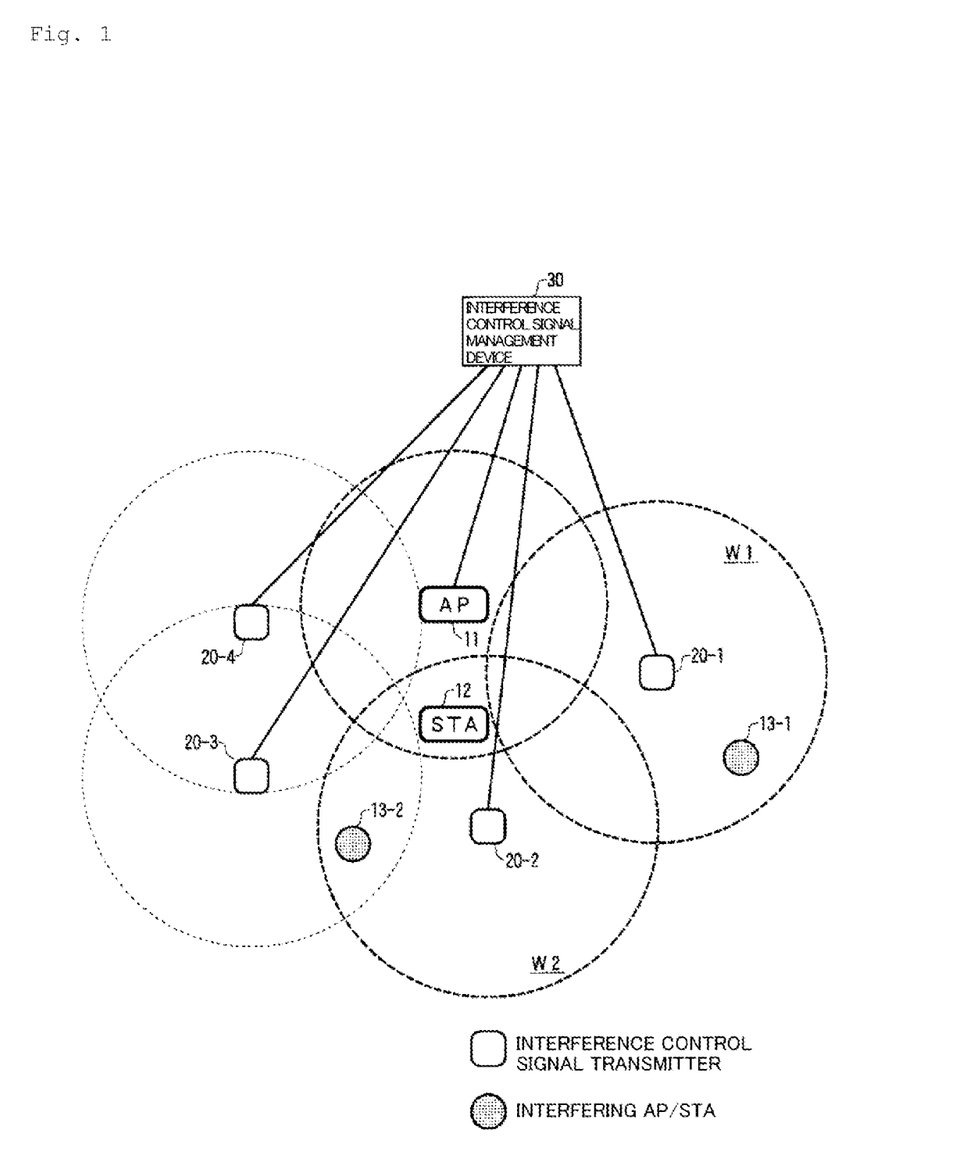
FIG. 1 is a diagram illustrating an example of a configuration of a wireless LAN system according to the present invention.

FIG. 1 shows an example of a configuration of a wireless LAN system according to the present invention.

In FIG. 1, a wireless environment is assumed in which there are a wireless LAN base station (AP: Access Point) 11 and a wireless LAN terminal (STA: Station) 12 that are protection targets for which preferential communication is required, and interfering AP/STAs 13-1 and 13-2 that are located in the surroundings thereof and serve as interference sources. Furthermore, there are interference control signal transmitters 20-1 to 20-4 that acquire wireless environment information regarding the interfering AP/STAs, and an interference control signal management device 30 that is connected to the AP 11 and the interference control signal transmitters 20-1 to 20-4 via a network. It is assumed here that the interfering AP/STA 13-1 is located in the communication area of the interference control signal transmitter 20-1, the interfering AP/STA 13-2 is located in the communication areas of the interference control signal transmitters 20-2 and 20-3, and no interfering AP/STA is located in the communication areas of the AP 11 and the interference control signal transmitter 20-4.

The present invention is characterized in that the interference control signal management device 30 acquires a piece of information regarding the AP 11, and the pieces of wireless environment information collected by the interference control signal transmitters 20-1 to 20-4, and recognizes the interfering AP/STAs 13-1 and 13-2 that are provided in the surroundings of the AP 11 and the STA 12, and use the same channel as those used by the AP 11 and the STA 12, and the interference control signal transmitters 20-1, 20-2, and 20-3 whose communication areas include the interfering AP/STAs. Also, the interference control signal management device 30 causes the interference control signal transmitters 20-1 to 20-3 to transmit a CTS-to-self signal, so that a NAV (Network Allocation Vector) is set for the interfering AP/STA 13-1 and 13-2 located in the communication areas thereof. Accordingly, the interference control signal management device 30 creates a clean radio wave environment without interference signals in the surroundings of the AP 11 and the STA 12, and ensures preferential communication between the AP 11 and the STA 12.

Note that the interfering AP/STA 13-2 is located in the common potion of the communication areas of the plurality of interference control signal transmitters 20-2 and 20-3, but in this case, the interference control signal management device 30 selects one interference control signal transmitter (here, 20-2) out of them. At this time, the clean radio wave environment for the AP 11 and the STA 12 refers to communication areas (range that the CTS-to-self signals reach) W1 and W2 of the interference control signal transmitters 20-1 and 20-2.

Although there is no interfering AP/STA in the communication areas of the AP 11 and the interference control signal transmitter 20-4, the interference control signal management device 30 may also cause them to transmit a CTS-to-self signal in a preventive manner, in order to ensure a clean radio wave environment. Note however that if there are a plurality of adjacent interference control signal transmitters that receive power of a predetermined value or greater from each other, the interference control signal management device 30 may select interference control signal transmitters that receive power smaller than the predetermined value from each other, and cause them to transmit a CTS-to-self signal.

Figure 2:
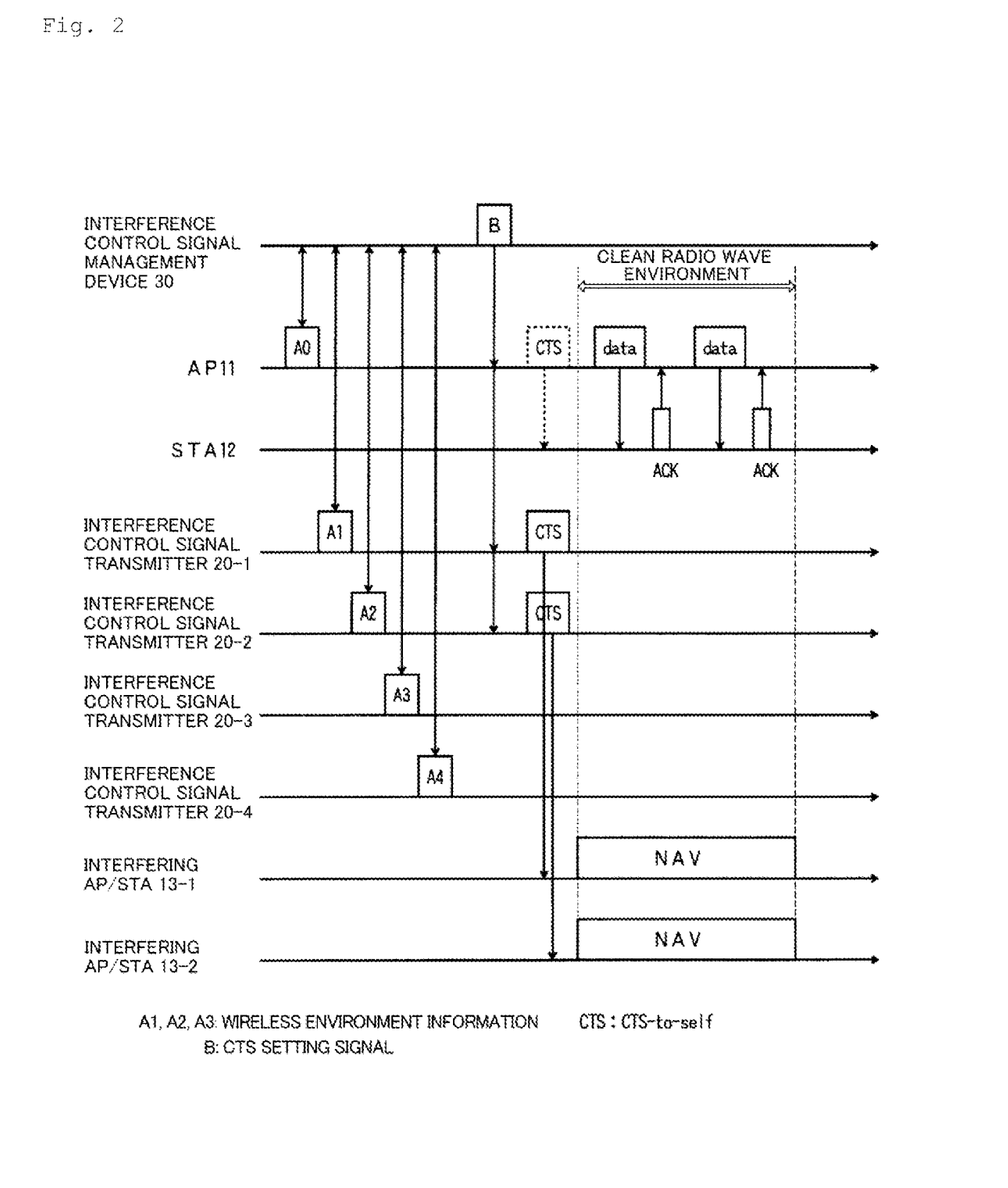
FIG. 2 is a diagram illustrating a first example of a control sequence of the wireless LAN system according to the present invention.

FIG. 2 shows a first example of a control sequence of the wireless LAN system according to the present invention.

In FIG. 2, the interference control signal management device 30 collects, from the AP 11, a piece of information A0 regarding communication with the STA 12, and collects, from the interference control signal transmitters 20-1 to 20-4, pieces of wireless environment information A1 to A4 regarding the interfering AP/STAs 13-1 and 13-2 located in any of the communication areas thereof. The interference control signal management device 30 selects, based on the pieces of information, the interference control signal transmitters 20-1 and 20-2 whose communication areas respectively include the interfering AP/STAs 13-1 and 13-2, and calculates a period of time that is to be allocated to the communication between the AP 11 and STA 12, which are protection targets. Then, the interference control signal management device 30 creates a scheduling policy relating to control of transmission of a CTS-to-self signal set as a duration value, and transmits the created scheduling policy, serving as a notification signal B, to the AP 11 and the interference control signal transmitters 20-1 and 20-2.

The interference control signal transmitters 20-1 and 20-2 transmit the CTS-to-self signal at the same time, namely, at a synchronized timing, and the interfering AP/STAs 13-1 and 13-2 located in the communication areas thereof set, upon receiving the signal, the NAV that corresponds to the duration value. Accordingly, interference is suppressed for the AP 11 and the STA 12, which are protection targets, for the period of time of the NAV, and preferential communication is ensured. Note that a configuration is possible in which the AP 11 also transmits a CTS-to-self signal. In this case, the STA 12 also sets a NAV but can transmit an ACK signal for a data signal transmitted to itself.

Figure 3:
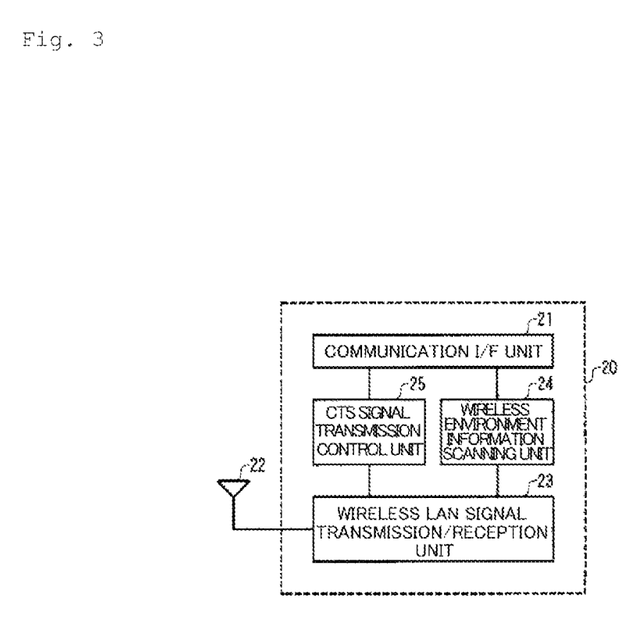
FIG. 3 is a diagram illustrating an example of a configuration of an interference control signal transmitter 20 according to the present invention.

FIG. 3 shows an example of a configuration of each interference control signal transmitter 20 according to the present invention.

In FIG. 3, the interference control signal transmitter 20 includes a communication I/F unit 21 that communicates with the interference control signal management device 30, an antenna 22 and a wireless LAN signal transmission/reception unit 23 that transmit and receive a wireless LAN signal, a wireless environment information scanning unit 24, and a CTS signal transmission control unit 25. Here, the wireless environment information scanning unit 24 controls the wireless LAN signal transmission/reception unit 23 to collect wireless environment information, and transmits the collected wireless environment information to the interference control signal management device 30 via the communication I/F unit 21. Also, the CTS signal transmission control unit 25 accepts an input of a notification signal (scheduling policy) from the interference control signal management device 30 via the communication I/F unit 21, generates a CTS signal in accordance with the given scheduling policy, and transmits the generated CTS signal from the wireless LAN signal transmission/reception unit 23.

Figure 4:
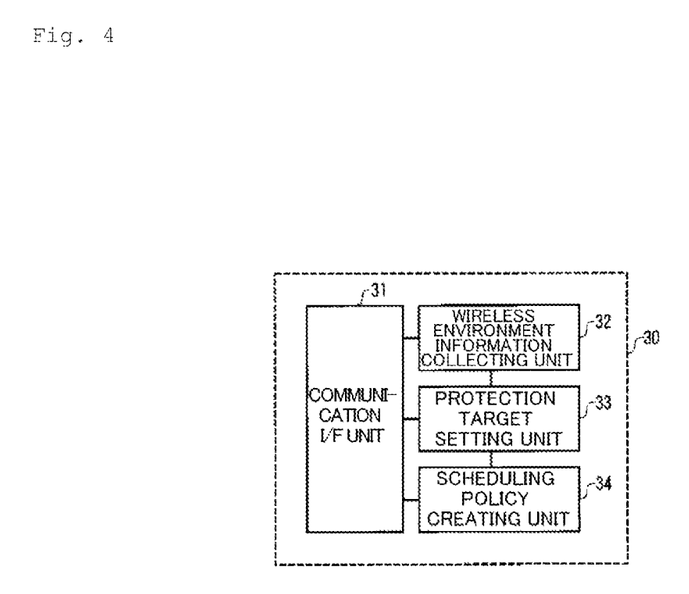
FIG. 4 is a diagram illustrating an example of a configuration of an interference control signal management device 30 according to the present invention.

FIG. 4 shows an example of a configuration of the interference control signal management device 30 according to the present invention.

In FIG. 4, the interference control signal management device 30 includes a communication I/F unit 31 that communicates with the AP 11 and the interference control signal transmitters 20, a wireless environment information collecting unit 32 that collects pieces of wireless environment information given from the interference control signal transmitters 20, a protection target setting unit 33 that sets an AP and a STA that serve as protection targets, and a scheduling policy creating unit 34. Here, the scheduling policy creating unit 34 calculates the duration value that corresponds to the period of time of communication between the AP and STA serving as protection targets, and determines an interfering AP/STA 13 that serves as a co-channel interference source with respect to the AP and STA serving as protection targets. Also, the scheduling policy creating unit 34 selects the interference control signal transmitter 20 whose communication area includes this interfering AP/STA 13, and creates a scheduling policy that instructs this interference control signal transmitter 20 to transmit a CTS signal that contains the duration value. The interference control signal management device 30 transmits the scheduling policy created by the scheduling policy creating unit 34, serving as a notification signal, to the interference control signal transmitter 20 selected by the scheduling policy creating unit 34.

Here, examples of the "wireless environment information" include a SSID (Service Set IDentifier), a channel, a bandwidth, a used wireless LAN standard, an RSSI (Received Signal Strength Indicator) that are described in a wireless LAN frame observed in each channel of the wireless LAN. The interference control signal management device 30 determines, based on the pieces of wireless environment information, the interfering AP/STA 13 that serves as an interference source with respect to the AP 11 and STA 12, which are protection targets, and the interference control signal transmitter 20 that transmits the CTS signal to this interfering AP/STA 13, and performs notification. The CTS signal transmission control unit 25 of the interference control signal transmitter 20 generates a CTS signal in accordance with the scheduling policy given from the interference control signal management device 30, and performs control so that the CTS signal is transmitted at a designated timing, in a designated channel, and with a designated transmission power.

Figure 5:
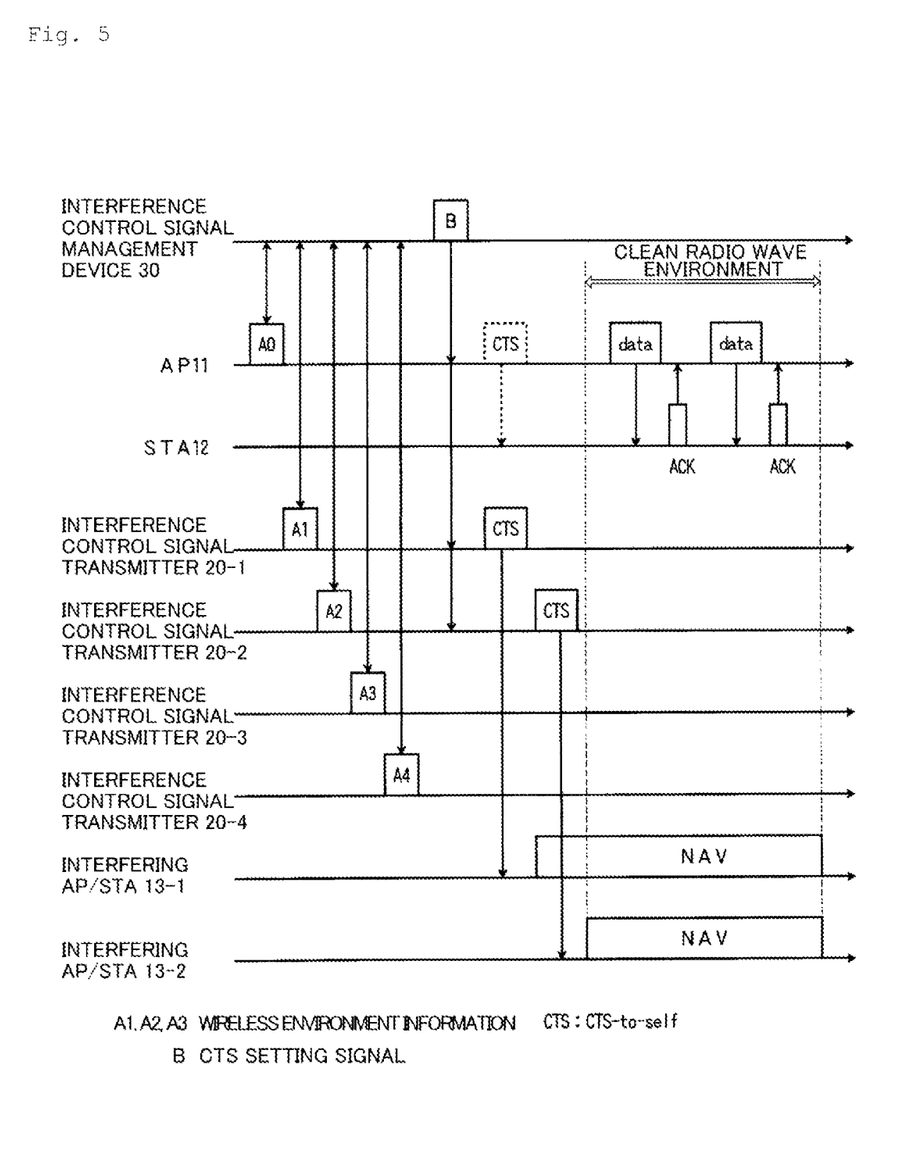
FIG. 5 is a diagram illustrating a second example of the control sequence of the wireless LAN system according to the present invention.

FIG. 5 shows a second example of the control sequence of the wireless LAN system according to the present invention.

In FIG. 5, the interference control signal management device 30 selects, based on the piece of information A0 regarding the AP 11 and the pieces of wireless environment information A1 to $A_4$ given from the interference control signal transmitters 20-1 to 20-4, the interference control signal transmitters 20-1 and 20-2 whose communication areas respectively include the interfering AP/STAs 13-1 and 13-2, and calculates a period of time that is to be allocated to the communication between the AP 11 and STA 12, which are protection targets. Then, the interference control signal management device 30 transmits a notification signal to the interference control signal transmitters 20-1 and 20-2 so that they transmit a CTS-to-self signal set as a duration value. Up to here, the procedure is the same as that of the first example shown in FIG. 2.

The second example is characterized in that the interference control signal transmitters 20-1 and 20-2 transmit a CTS-to-self signal in order rather than at the same time. Note however that the interference control signal management device 30 sets the order in which the interference control signal transmitters 20-1 and 20-2 transmit the CTS-to-self signal, and the duration values of the CTS-to-self signals, so that the NAVs set by the interfering AP/STA 13-1 and 13-2 end at the same time. Accordingly, even in a case where, as shown in FIG. 1 for example, the communication areas of the interference control signal transmitters 20-1 and 20-2 partially overlap each other, it is possible to avoid a collision between CTS-to-self signals.

Figure 6:
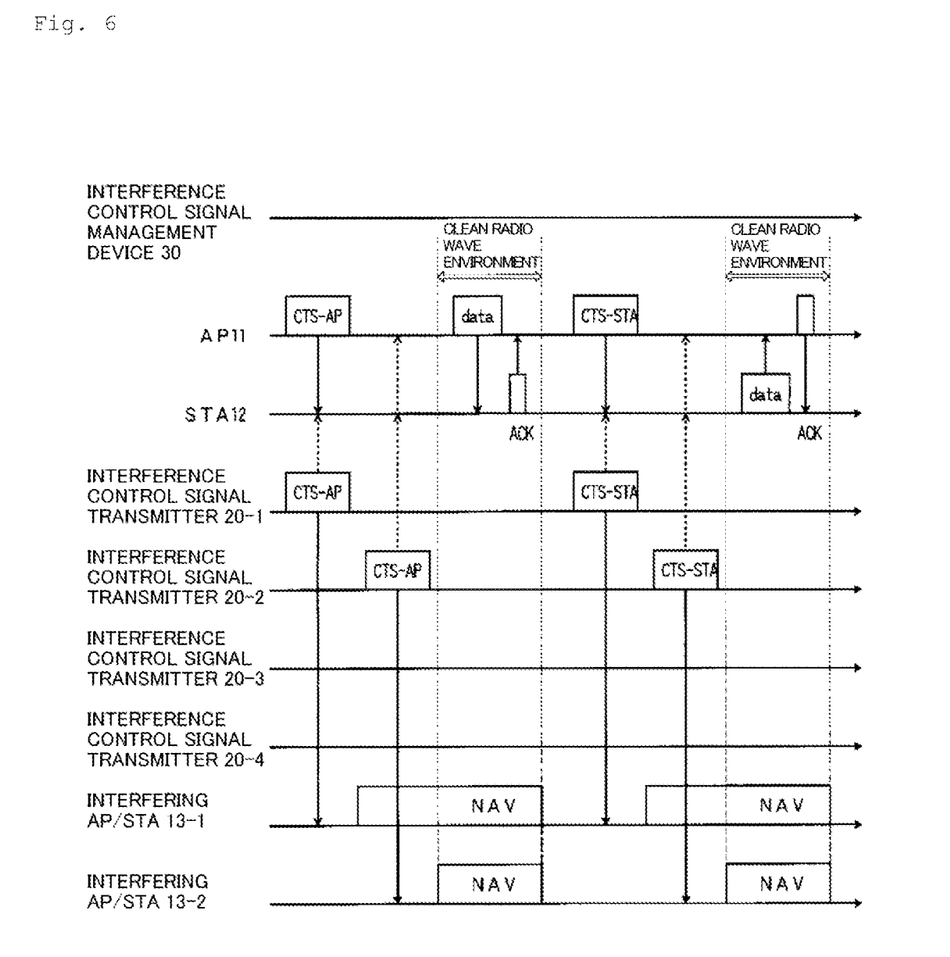
FIG. 6 is a diagram illustrating a third example of the control sequence of the wireless LAN system according to the present invention.

FIG. 6 shows a third example of the control sequence of the wireless LAN system according to the present invention. Here, an example is shown in which scheduling is performed that corresponds to the uplink and the downlink of the AP 11 and STA 12, which are protection targets.

In FIG. 6, at a timing at which downlink data is transmitted from the AP 11 to the STA 12, the AP 11 and the interference control signal transmitters 20-1 and 20-2 transmit a CTS signal that is addressed to the AP 11. At this time, the interfering AP/STA 13-1 and 13-2 located in the communication areas thereof respectively set the NAVs, and form a clean radio wave environment for the AP 11 and the STA 12, which are protection targets. During this period of time, the downlink data is transmitted from the AP 11 to the STA 12.

Note that the STA 12 sets a NAV upon receiving the CTS signals addressed to the AP 11 from the AP 11 and the interference control signal transmitters 20-1 and 20-2, but can transmit an ACK signal with respect to the downlink data addressed to the STA 12. Also, the AP 11 does not set a NAV even upon receiving the CTS signals addressed to the AP 11 from the interference control signal transmitters 20-1 and 20-2, and thus there is no problem in transmission of the downlink data.

At a timing at which uplink data is transmitted from the STA 12 to the AP 11, the AP 11 and the interference control signal transmitters 20-1 and 20-2 transmit a CTS signal that is addressed to the STA 12. At this time, the STA 12 that has received the CTS signal addressed to itself does not set a NAV, but the interfering AP/STA 13-1 and 13-2 located in the communication areas of the interference control signal transmitters 20-1 and 20-2 respectively set NAVs, and form a clean radio wave environment for the AP 11 and STA 12, which are protection targets. During this period of time, the uplink data is transmitted from the STA 12 to the AP 11.

Note that the STA 12 does not set a NAV even upon receiving the CTS signals addressed to the STA 12 from the AP 11 and the interference control signal transmitters 20-1 and 20-2, and thus there is no problem in transmission of the uplink data. The AP 11 sets a NAV upon receiving the CTS signals addressed to the STA 12 from the interference control signal transmitters 20-1 and 20-2, but can transmit an ACK signal with respect to the uplink data addressed to the AP 11.

Figure 7:
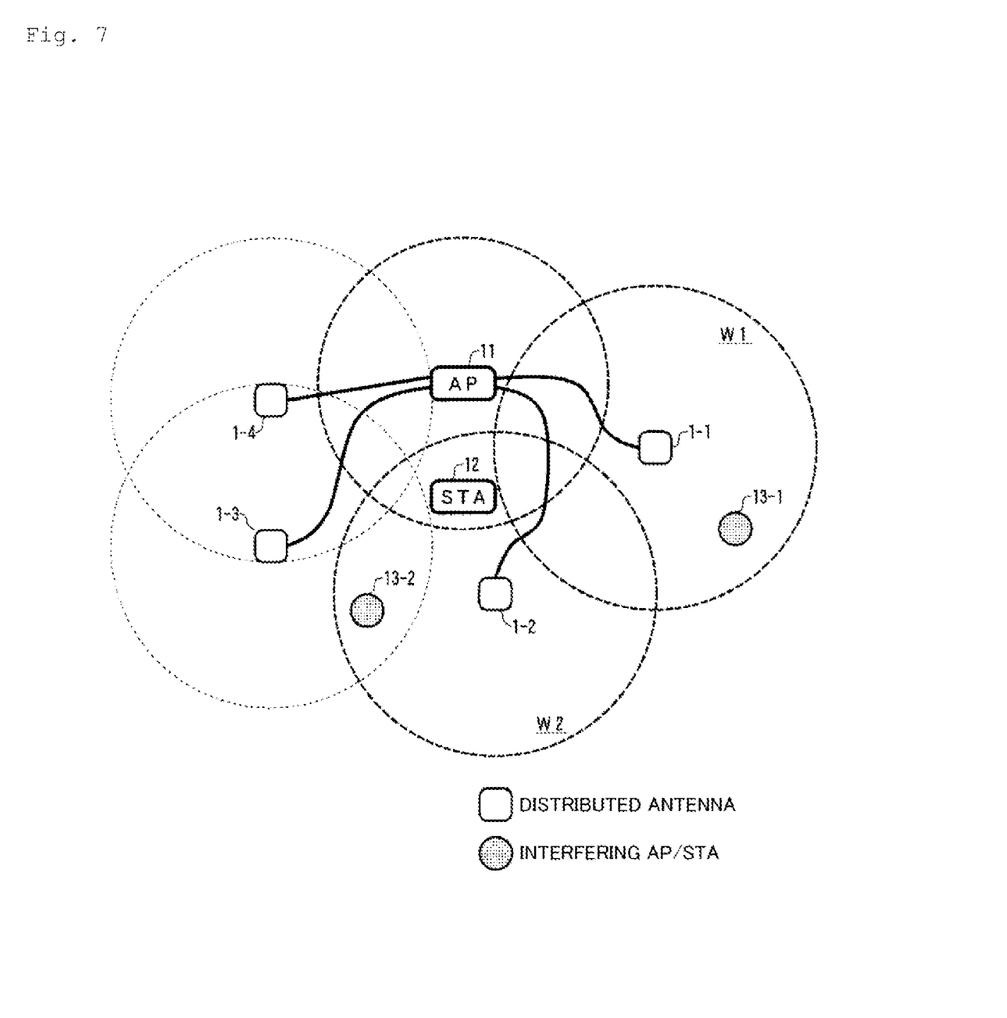
FIG. 7 is a diagram illustrating another example of the configuration of the wireless LAN system according to the present invention.

FIG. 7 shows another example of the configuration of the wireless LAN system according to the present invention.

In FIG. 7, a configuration is such that the AP 11 includes a plurality of distributed antennas, and the distributed antennas 1-1 to 1-4 are arranged at the positions of the interference control signal transmitters 20-1 to 20-4 shown in FIG. 1. Also, the AP 11 has the function of the interference control signal transmitter 20 shown in FIG. 3 and the function of the interference control signal management device 30 shown in FIG. 4. Accordingly, the interference control signal management device 30 provided in the AP 11 transmits, based on an interfering AP/STA 13 detected via the distributed antennas, a CTS signal from the corresponding distributed antenna, and thereby creates a clean radio wave environment for the AP 11 and the STA 12, which are protection targets, making it possible to ensure preferential communication between the AP 11 and the STA 12.

REFERENCE SIGNS LIST

11 Wireless LAN base station (AP)
12 Wireless LAN terminal (STA)
13 Interfering AP/STA
20 Interference control signal transmitter
21 Communication I/F unit
22 Antenna
23 Wireless LAN signal transmission/reception unit
24 Wireless environment information scanning unit
25 CTS signal transmission control unit
30 Interference control signal management device
31 Communication I/F unit
32 Wireless environment information collecting unit
33 Protection target setting unit
34 Scheduling policy creating unit

The invention claimed is:

1. A wireless LAN system in which, in the surroundings of a wireless LAN base station and a wireless LAN terminal that perform communication with each other, there is an interfering AP/STA that is to transmit an interference signal, comprising: an interference control signal transmitter that is provided in the surroundings of the wireless LAN base station and the wireless LAN terminal, and is configured to collect wireless environment information regarding the interfering AP/STA, and transmit, to the interfering AP/STA, an interference control signal that is to be used to set a transmission waiting period; and an interference control signal management device configured to collect the wireless environment information from the interference control signal transmitter, determine the interference control signal transmitter whose communication area includes the interfering AP/STA based on the wireless environment information, and control the determined interference control signal transmitter to transmit the interference control signal to be used to set the transmission waiting period that corresponds to a length of time of the communication between the wireless LAN base station and the wireless LAN terminal, wherein while the interfering AP/STA that has received the interference control signal sets the transmission waiting period, the wireless LAN base station and the wireless LAN terminal preferentially perform communication.

2. The wireless LAN system according to claim 1, wherein if there are a plurality of the interference control signal transmitters, the interference control signal management device is configured to perform control such that the transmission waiting periods to be set using the interference control signals transmitted from the interference control signal transmitters are equal to each other, and the interference control signal transmitters transmit the interference control signals in synchronization with each other.

3. The wireless LAN system according to claim 1, wherein if there are a plurality of the interference control signal transmitters, the interference control signal management device is configured to perform control such that the interference control signal transmitters transmit the interference control signals in a predetermined order, and the transmission waiting periods to be set using the interference control signals end at the same time.

4. The wireless LAN system according to claim 1, wherein the interference control signal is a CTS signal that is used to set the transmission waiting period when a wireless LAN device that is not the destination of the CTS signal receives the CTS signal, and the interference control signal management device is configured to perform control such that the destination of the CTS signal is set to the wireless LAN base station when the wireless LAN base station transmits downlink data, and the destination of the CTS signal is set to the wireless LAN terminal when the wireless LAN terminal transmits uplink data.

5. The wireless LAN system according to claim 1, wherein the wireless LAN base station includes a distributed antenna that is arranged in the surroundings of the wireless LAN base station and the wireless LAN terminal, and the wireless LAN base station has functions of the interference control signal transmitter of collecting wireless environment information regarding the interfering AP/STA via the distributed antenna, and transmitting, to the interfering AP/STA, an interference control signal that is to be used to set a transmission waiting period, and has functions of the interference control signal management device of determining the distributed antenna whose communication area includes the interfering AP/STA based on the wireless environment information, and performing control such that the interference control signal is transmitted from the determined distributed antenna, the interference control signal being used to set the transmission waiting period that corresponds to a length of time of the communication between the wireless LAN base station and the wireless LAN terminal.

6. An interference control method of a wireless LAN system in which, in the surroundings of a wireless LAN base station and a wireless LAN terminal that perform communication with each other, there is an interfering AP/STA that is to transmit an interference signal, the method comprising the steps of: an interference control signal transmitter provided in the surroundings of the wireless LAN base station and the wireless LAN terminal collecting wireless environment information regarding the interfering AP/STA, and transmitting, to the interfering AP/STA, an interference control signal that is to be used to set a transmission waiting period; and an interference control signal management device configured to collect the wireless environment information from the interference control signal transmitter determining the interference control signal transmitter whose communication area includes the interfering AP/STA based on the wireless environment information, and controlling the determined interference control signal transmitter to transmit the interference control signal to be used to set the transmission waiting period that corresponds to a length of time of the communication between the wireless LAN base station and the wireless LAN terminal, wherein while the interfering AP/STA that has received the interference control signal sets the transmission waiting period, the wireless LAN base station and the wireless LAN terminal preferentially perform communication.

7. The interference control method of the wireless LAN system according to claim 6, wherein the wireless LAN base station includes a distributed antenna that is arranged in the surroundings of the wireless LAN base station and the wireless LAN terminal, and the wireless LAN base station executes functions of the interference control signal transmitter of collecting wireless environment information regarding the interfering AP/STA via the distributed antenna, and transmitting, to the interfering AP/STA, an interference control signal that is to be used to set a transmission waiting period, and executes functions of the interference control signal management device of determining the distributed antenna whose communication area includes the interfering AP/STA based on the wireless environment information, and performing control such that the interference control signal is transmitted from the determined distributed antenna, the interference control signal being used to set the transmission waiting period that corresponds to a length of time of the communication between the wireless LAN base station and the wireless LAN terminal.

\* \* \* \* \*